United States Patent [19]

Kitami et al.

[11] Patent Number: 4,846,768
[45] Date of Patent: Jul. 11, 1989

[54] VARIABLE-SPEED DRIVING DEVICE

[75] Inventors: Yasuo Kitami; Hidenori Tezuka; Syuji Watanabe, all of Saitama, Japan

[73] Assignee: Honda Giken Kogyo Kabushiki Kaisha, Tokyo, Japan

[21] Appl. No.: 141,982

[22] Filed: Jan. 11, 1988

[30] Foreign Application Priority Data

Jan. 9, 1987 [JP] Japan ................................ 62-1920

[51] Int. Cl.$^4$ ............................................. F16H 7/00
[52] U.S. Cl. ........................................ 474/86; 74/752 E
[58] Field of Search ............................ 474/84–89, 474/171; 74/752 E; 192/104 C

[56] References Cited

U.S. PATENT DOCUMENTS

| | | | |
|---|---|---|---|
| 4,296,717 | 10/1981 | Schlagmuller | 474/87 X |
| 4,412,460 | 11/1983 | Barthelemy | |
| 4,662,861 | 5/1987 | Seung et al. | 744/86 |

FOREIGN PATENT DOCUMENTS 60-38933  9/1985  Japan .

*Primary Examiner*—Thuy M. Bui
*Attorney, Agent, or Firm*—Lyon & Lyon

[57] ABSTRACT

A variable-speed driving device particularly adapted for an automotive internal combustion engine and associated AC generator. The device includes a driver shaft, such as the crankshaft, a constant-speed-ratio driven shaft, a variable-speed-ratio driven shaft, such as the AC generator shaft, two driver pulleys of different diameters mounted on the driver shaft, a single constant-speed-ratio driven pulley mounted on the constant-speed-ratio driven shaft, and two speed-changing pulleys mounted on the variable-speed-ratio driven shaft. One driving belt is trained over a drive pulley, single constant-speed-ratio driven pulley, and one pulley and an additional belt is trained around the second drive pulley, the second speed-changing pulley, and, if desired, over another constant-speed-ratio pulley on another shaft. There is a changeover mechanism for selectively coupling the speed-changing pulleys to the variable-speed-ratio driven shaft at the desired speed ratio depending on the speed of the driver shaft.

5 Claims, 2 Drawing Sheets

VARIABLE-SPEED DRIVING DEVICE

BACKGROUND OF THE INVENTION

The present invention relates to a driving device for driving a driven shaft with small variations in the speed of rotation thereof even when the speed of rotation of a driver shaft is varied, the driving device being employed, for example, to drive accessories of an automotive engine from its crankshaft where large variations in the speed of rotation of the accessories are undesirable.

AC generators serving as power supplies for electric systems associated with international combustion engines normally are driven by the crankshafts thereof at a speed directly proportional to the speed of the crankshaft. The AC generator is designed to generate enough electric power even when the engine operates in a low-speed range. Therefore, when the engine operates at a high-speed, the AC generator produces excessive electric power and puts an undue load on the engine. Various proposals have heretofore been made to eliminate these shortcomings. According to one attempt, the driven pulley mounted on the generator comprises a variable-diameter pulley with its effective diameter varied according to the electromotive force of the generator for driving the generator at a constant speed (see Japanese Patent Publication No. 60-38933). Another proposal includes pulleys with clutches, the pulleys being mounted on a crankshaft and a camshaft, respectively, these pulleys are operatively coupled to the pulley of a generator by a single belt. During low-speed operation, the clutch of the pulley on the crankshaft is engaged to drive the generator with the crankshaft, and during high-speed operation, the clutch of the pulley on the camshaft is engaged to drive the generator with the camshaft at ½ of the speed of rotation of the crankshaft (see Japanese Laid-Open Patent Publication No. 50-121603 and U.S. Pat. No. 4,296,717). According to still another known arrangement, the outer and inner gears of an internal gear pump are used as shaft couplings, and the rotational speed of the generator which is driven is varied by controlling the flow rate of the gear pump (see Japanese Laid-Open Patent Publication No. 56-6020). Also see another arrangement disclosure in U.S. Pat. No. 4,412,460 for driving a generator at two different speeds.

In the proposal first described above, a slide shaft is disposed in a rotor shaft of the generator and is magnetized by a current flowing through the rotor. The slide shaft is axially moved dependent on the current to move the sheave of the pulley. Therefore, the rotor shaft of the generator must be of a double-shaft construction which is complex and expensive. The second described system requires the clutches to be coupled respectively to the crankshaft and the camshaft and hence is expensive. Moreover, the clutch on the crankshaft results in a substantial increase in the length of the crankshaft. The axial length of the engine is therefore increased, and the engine compartment must be enlarged to accommodate the engine. The third described arrangement is disadvantageous in that the temperature of lubricating oil rises because the oil is forced to flow by the gear pump is restricted by a valve.

SUMMARY OF THE INVENTION

In order to eliminate the conventional drawbacks, the present invention provides a driving device of a simple mechanism for driving a driven component such as an electric generator at variable speeds. The variable-speed driving device comprises a driver shaft, a constant-speed-ratio driven shaft, a variable-speed-ratio driven shaft, a plurality of driver pulleys of different diameters mounted on the driver shaft, a single constant-speed-ratio driven pulley, as many speed-changing pulleys mounted on the variable-speed ration driven shaft as the number of the driver pulleys, a changeover mechanism for selectively coupling the speed-changing pulleys to the variable-speed-ration driven shaft, a rotation transmission system for driving one of the driver pulleys, the constant-speed-ratio driven pulley, and one of the speed-changing pulleys, and another rotation transmission system for driving at least the other driver pulley and the other speed-changing pulley.

When the speed of rotation of the driver shaft reaches or exceeds a prescribed speed, one of the speed-changing pulleys or the low-speed pulley is disconnected from the variable-speed-ratio driven shaft, and the other speed-changing pulley or high-speed pulley is connected to the variable-speed-ratio driven shaft to switch from one of the rotation transmission systems to the other, for thereby varying the speed of rotation of the variable-speed-ration driven shaft.

Preferred embodiments of the present invention will hereinafter be described with reference to the drawings, wherein:

BRIEF DESCRIPTION OF THE DRAWINGS

FIG. 1 shows an accessory driving device for use with an automotive engine. The driving system includes a crankshaft 1, a compressor shaft 2 for an air-conditioner, an oil pressure pump shaft 3 for a power steering mechanism, and an AC generator shaft 4. Driver pulleys 5 and 6 of different diameters are fixedly mounted on the crankshaft 1. A driven pulley 7 which is connectable and releasable by an electromagnetic clutch is mounted on the compressor shaft 2. Another driven pulley 8 is fixed to the oil pressure pump shaft 3 which is coupled to an oil pressure pump with a relief valve. Speed-changing pulleys 9 and 10 which are operable at high- and low-speeds, respectively, of the engine (hereinafter referred to as high-speed pulley 9 and low-speed pulley 10), are mounted on the AC generator shaft 4, also shown in FIG. 2.

DESCRIPTION OF THE PREFERRED EMBODIMENTS

Figure 1:
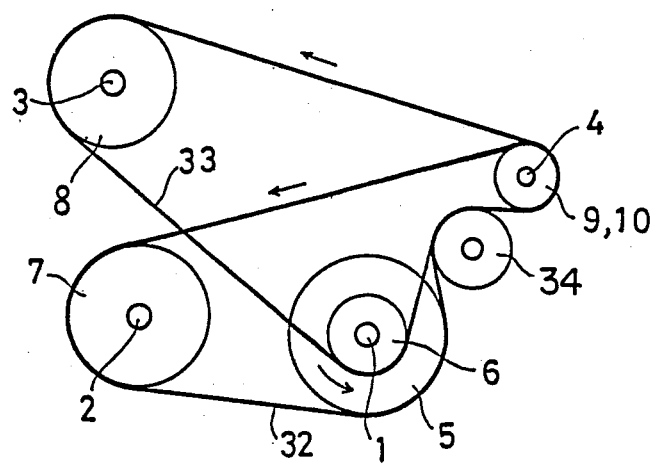
FIG. 1 is a front evaluation view of one embodiment of the drive system of the invention.
Figure 2:
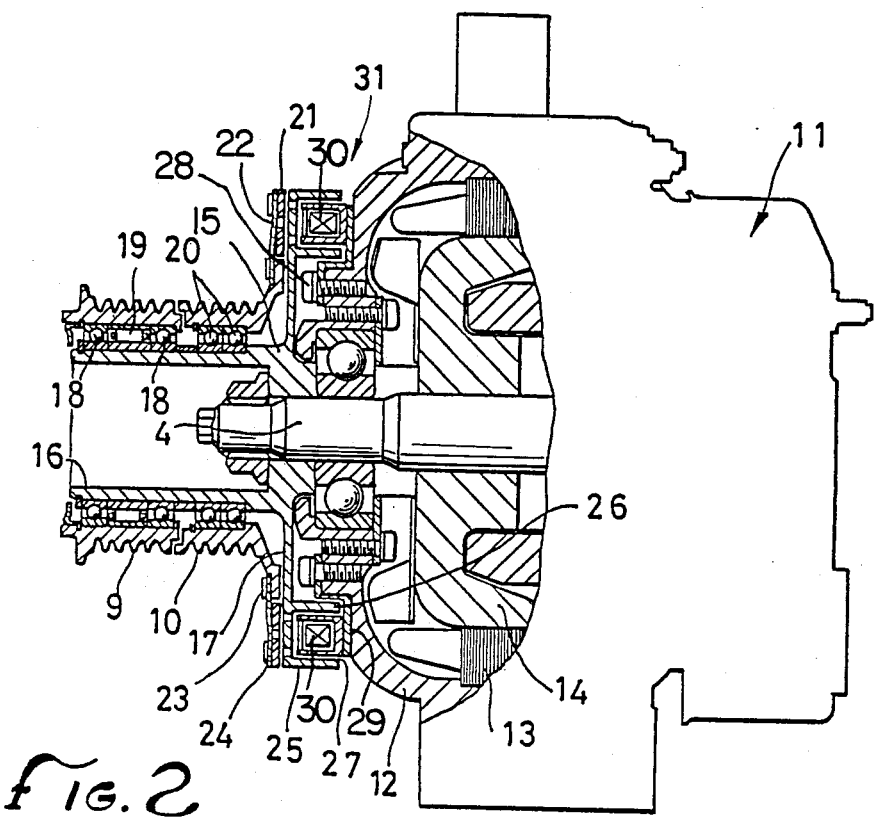
FIG. 2 is a side view, with portions is section, of a changeover mechanism used in the drive system of this invention.

As shown in FIG. 2, an AC generator 11 has a case 12, a stator 13, a rotor 14 with its shaft 4 fixed to a pulley support 15. The pulley support 15 comprises a sleeve 16 and a flange 17. The high-speed pulley 9 is mounted on the sleeve 16 by ball bearings 18 and a one-way clutch 19. The low-speed pulley 10 is also mounted on the sleeve 16 by ball bearings 20.

A clutch plate 21 is connected to a flange on the inner end of the low-speed pulley 10 by means of a spring plate 22 and pins 23, 24. The clutch plate 21 is disposed in confronting relation to the outer surface of the pulley support flange 17 with a small gap therebetween. The inner surface of the flange 17 has an annular groove 27 defined between ribs 25, 26 projecting from the inner surface of the flange 17. An electromagnet 30 is fixed to the case 12 of the AC generator 11 by means of screws 28 and an attachment plate 29. The electromagnet 30 is disposed in the annular groove 27. The electromagnet 30 and the clutch plate 21 jointly constitute an electromagnetic clutch 31 serving as a changeover mechanism.

The speed ratio between the pulleys 5, 10 and the speed ratio between the pulleys 6, 9 can be established as desired. In this embodiment, however, the speed ratio r between the pulleys 5, 10 is selected to be 2.51, and the speed ratio r between the pulleys 6, 9 is selected to be 1.27. The pulleys 5, 7, 10 are located in one plane and a rotation transmission means 32, hereinafter referred to simply as a "belt," is trained around these pulleys 5, 7, 10, thus providing a transmission system operable at low engine speed (hereinafter referred to as "low-speed rotation transmission system") whereby the pulley 10 is rotated at 2.51 times the speed of rotation of crankshaft 1. A belt 33 is trained around the pulleys 6, 8, 9, thus providing a transmission system operable at high engine speed (hereinafter referred to as "high-speed rotation transmission system") whereby pulley 9 is rotated at 1.27 times the speed of rotation of crankshaft. The belts 32, 33 are tensioned by idlers 34 and may be of any conventional form such as "V" belts, roller chains, timing belts, etc.

The compressor shaft 2 and the oil pressure pump shaft 3 are driven shafts rotatable at constant speed ratios by the crankshaft 1. The AC generator shaft 4 is a driven shaft rotatable at a variable-speed-ratio.

Figure 3:
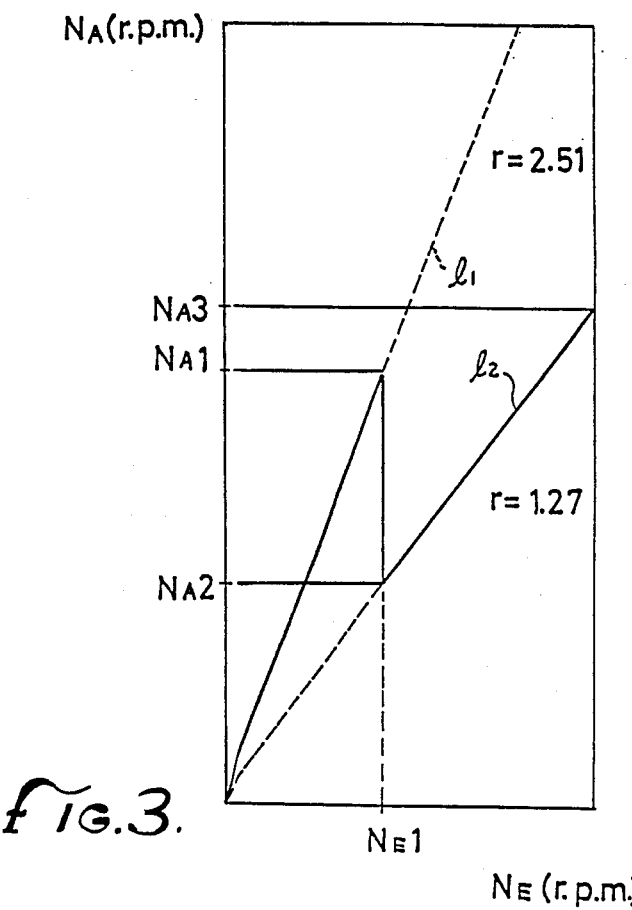
FIG. 3 is a graph showing the speed-change operation relationship between engine speed and generator speed; and, FIG. 4 is a front elevation view similar to FIG. 1 of a second embodiment of the present invention.

When the rotational speed of the crankshaft 1, i.e., the rotational speed $N_E$ of the engine is increased, the speed $N_A$ of the pulleys 9, 10 is varied as shown in FIG. 3. the curve $l_1$ indicates variations in the speed of the low-speed pulley 10, and the curve $l_2$ indicates variations in the speed of the high-speed pulley 9. Since the pulley 10 is driven by the larger-diameter driver pulley 5, the pulley 10 rotates at a higher speed than the speed of the pulley 9 at all times.

When the engine speed is low, the electromagnetic clutch 31 is actuated to attract the clutch plate 21 to the flange 17. The low-speed pulley 10 is thus connected to the generator shaft 4 through the pulley support 15 to drive the generator 11 at a speed indicated by the curve $l_1$ in FIG. 3. At this time, the one-way clutch 19 of the high-speed pulley 9 is idling since the pulley support 15 rotates at a higher speed than the speed of the pulley 9. When the electromagnetic clutch 31 is disengaged at the time the speed of the generator 11 reaches $N_A 1$ and the speed of the engine reaches $N_E 1$, the torque is transmitted from the pulley 9 through the one-way clutch 19 to the generator shaft 4.

By thus switching between the rotation transmission systems, the speed of the generator 11 is lowered to $N_A 2$ and then increases along the curve $l_2$ as the engine speed rises. Therefore, the maximum speed $N_A 3$ of the generator 11 can be limited to about 10,000 rpm to keep the generated electric power below a prescribed level. Since the speed ratios indicated by the curves $l_1$, $l_2$ are about 2:1, the speed of the rotation of the generator can be reduced to about ½ by switching to the high-speed rotation transmission system. The difference, as determined by an experiment, between electric power consumptions caused when the generator is driven at $N_A = 15,000$ rpm without switching to the high-speed rotation transmission system and when the generator is driven at $N_A = 7,500$ rpm by switching to the high-speed rotation transmission system, was about 0.5 PS.

The point where the rotational speed $N_A$ of the generator is changed by be controlled by the engine speed $N_E$, as described above. Such speed changing point can be varied by also taking into account the magnitude of the electric load on the generator. It is necessary to provide a some degree of hysteresis in changing the rotational speed of the generator in order to increase the service life of the control mechanism.

Figure 4:
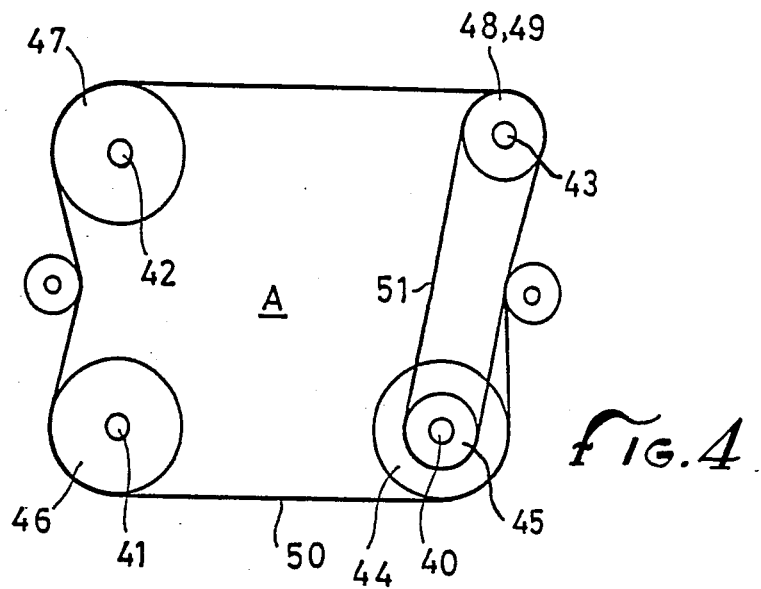

FIG. 4 shows another embodiment in which a crankshaft 40 supports driver pulleys 44, 45, a compressor shaft 41 supports a driven pulley 46, an oil pressure pump shaft 41 supports a driven pulley 47, and a generator shaft 43 supports drive pulleys 48, 49, the pulleys 44, 46, 47, 48 being drivable by a single belt 50 and the pulleys 45, 49 being drivable by a single belt 51. The same changeover mechanism as that shown in FIG. 2, including the one-way clutch and the electromagnetic clutch, is disposed between the generator shaft 43 and the pulleys 48, 49.

The generator shown in FIG. 4 is driven in the same manner as the generator according to the previous embodiment. Since the belt 50 extends only around the outer profile of the engine, a large space A is available within the belt 50 for positioning other accessories therein.

It should be noted that the two driven pulleys 9, 10 in the first embodiment or 48, 49 in the second embodiment can readily be of different sizes to provide a different ratio between the high- and low-speed drives of the generator, if so desired, without changing any of the other pulleys or ratios.

With the present invention, as described above, the variable-speed-ratio driven shaft is combined with a plurality of speed-changing pulleys and a changeover mechanism for selecting such pulleys. Therefore, it is not necessary to provide the drive shaft with such a changeover mechanism. Where the present invention is employed as a driving device for driving accessories of an automotive engine, the changeover mechanism is mounted on the short generator shaft, rather than on the long crankshaft which would result in lengthening the engine. Therefore, the mechanism for controlling the speed of rotation of the generator can be provided without increasing the length of the engine.

Moreover, the power systems for driving the constant-speed-ratio driven shafts are utilized for driving the variable-speed-ratio driven shaft, and only one changeover mechanism is required. Accordingly, the overall transmission mechanism is simple.

What is claimed is:

1. A variable-speed driving device comprising a driver shaft, a constant-speed-ratio driven shaft, a variable-speed-ratio driven shaft, a plurality of driver pulleys of different diameters mounted on said driver shaft, a single constant-speed-ratio driven pulley, a plurality of speed-changing pulleys mounted on said variable-speed-ratio driven shaft equal to said plurality of said drive pulleys, a changeover mechanism for selectively coupling said speed-changing pulleys to said variable-speed-ratio driven shaft, a rotation transmission means for driving one of said driver pulleys, said constant-speed-ratio driven pulley, and one of said speed-changing pulleys, and another rotation transmission means for driving at least the other driver pulley and the other speed-changing pulley.

2. A variable-speed driving device according to claim 1, wherein the speed-changing pulleys include low-speed and high-speed pulleys, said changeover mechanism being operable to switch from said low-speed pulley to said high-speed pulley for connection to said variable-speed-ratio driven shaft when the speed of rotation of said driver shaft increases beyond a prescribed speed.

3. A variable-speed driving device according to claim 1, wherein each of rotation transmission means comprises a belt trained around the respective pulleys.

4. A variable-speed driving device according to claim 1, wherein at least one of said rotation transmission means is arranged to drive another constant-speed-ratio driven pulley and shaft.

5. A variable-speed driving device according to claim 1, wherein one said rotation transmission means only engages and transmits the drive between one drive pulley and one speed-changing pulley.

* * * * *

UNITED STATES PATENT AND TRADEMARK OFFICE
CERTIFICATE OF CORRECTION

PATENT NO. : 4,846,768

DATED : July 11, 1989

INVENTOR(S) : Kitami et al.

It is certified that error appears in the above-identified patent and that said Letters Patent is hereby corrected as shown below:

Column 4, line 3 after "mechanism" insert --located exclusively on said variable speed-ratio driven shaft--.

Signed and Sealed this

Thirty-first Day of March, 1992

Attest:

HARRY F. MANBECK, JR.

Attesting Officer   Commissioner of Patents and Trademarks